Figure 1:
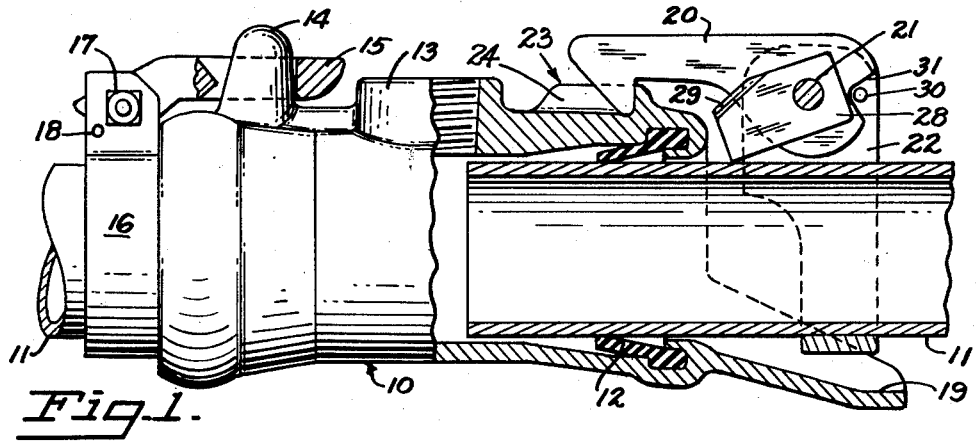

May 4, 1954 G. CORNELIUS 2,677,558
SELF-LOCKING PIPE COUPLER
Filed Aug. 7, 1950

INVENTOR.
GAIL CORNELIUS
BY
ATTORNEY

Patented May 4, 1954

2,677,558

UNITED STATES PATENT OFFICE 2,677,558

SELF-LOCKING PIPE COUPLER

Gail Cornelius, Portland, Oreg., assignor to R. M. Wade & Co., Portland, Oreg., a corporation of Oregon Application August 7, 1950, Serial No. 178,140

3 Claims. (Cl. 285—170)

This invention relates to pipe couplers of the kind generally employed in irrigating pipe lines and the like wherein a non-rigid fluid tight and quickly assembled coupling is desirable. This application is a continuation in part of my copending application entitled Self-Locking Pipe Coupler, filed July 25, 1949, Serial Number 106,549.

In pipe lines employed for sprinkling, irrigating and similar purposes, the pipe is often laid over the surface of the ground in lengths joined by couplings and is frequently moved from place to place. The couplings are usually designed to permit the pipe sections to be quickly and easily attached and detached. They must be fluid tight and are preferably sufficiently loose or flexible to permit the pipe to follow irregular terrain and gradual curves. All this is accomplished through the use of a coupling slightly larger in diameter than the external diameter of the pipe and flexible gaskets in the coupling to make a fluid tight joint when the pipe is inserted thereinto. Locking devices are employed to retain the pipe in the coupling and it is to such locking devices that the present invention is directed.

The lengths of the pipe which form the pipe line are coupled and uncoupled manually and preferably through some simple coupling and latching means that enables a worker to manipulate the end of a long length of pipe into its coupled position as he carries or holds the pipe at a point intermediate its ends, thus, saving time and labor which would be required if it were necessary for the workman first to lay the pipe upon the ground and then walk to its end for inserting it and latching it in place. There are several considerations involved in producing a secure coupling latch. For example, the coupling is assembled while there is no pressure in the pipe and there is a tendency for one length of pipe to roll or twist relative to the others. Then when pressure is introduced, the pipe tends to blow apart at its couplings and will do so if the latches have become insecure before the application of pressure.

It is the object of this invention to provide an improved pipe coupler and latch therefor which includes a self-locking device operating automatically upon assembling a pipe end into the coupler to latch it in place and to dog or lock the latch against becoming insecure by twisting or other forces taking place either before or after pressure is introduced into the line. Further and more specific objects and advantages of the invention are made apparent in the following specification wherein reference is made to the accompanying drawings.

Figure 2:
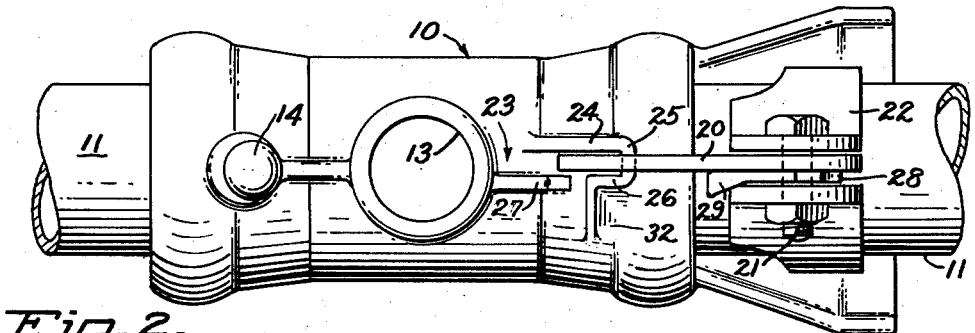
Figure 3:
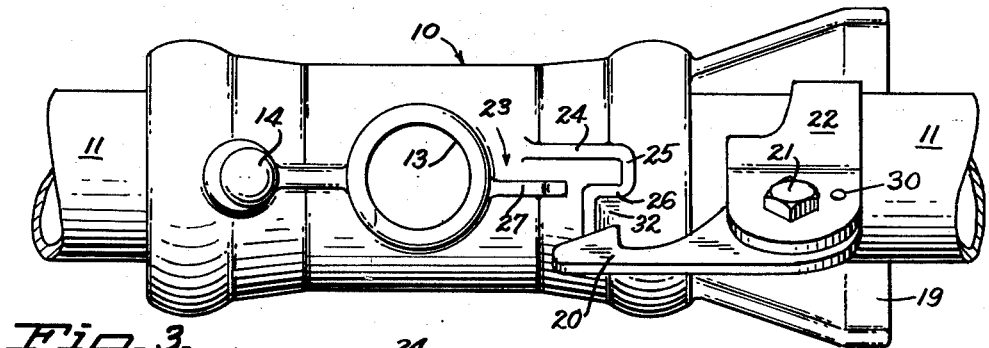
Figure 4:
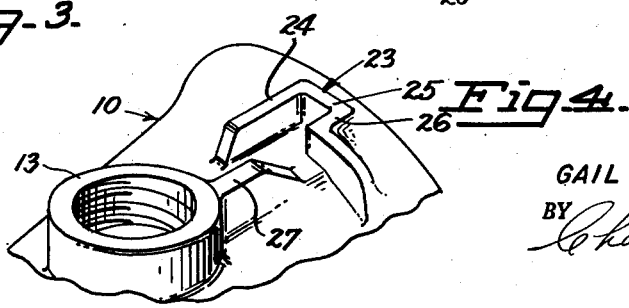

In the drawings:

Fig. 1 is a view in side elevation with parts shown in section of a pipe coupler including a locking device embodying the present invention, Fig. 2 is a plan view of the device shown in Fig. 1, Fig. 3 is a view similar to Fig. 2 showing the position occupied by the pipe just before it is completely assembled into the coupler, and Fig. 4 is a fragmentary perspective view of the part of the coupler which includes the locking device.

In the drawings, a pipe coupler is generally indicated at 10 as a substantially tubular casting into both ends of which the ends of pipe, such as indicated at 11, may be inserted to provide for the continuous flow of water or other fluid through sections of pipe which form a pipe line. Gaskets, such as indicated at 12 in Fig. 1, are provided in the ends of the couplings 10 to form a fluidtight seal between the coupling and the end of the pipe which extends into it. The coupling herein shown is provided with a threaded outlet 13 with which may be connected a sprinkler or branch pipe leading toward any suitable point of discharge.

At one end the coupling 10 is provided with a projection 14 which serves as a keeper for a latch member 15 shown, in Fig. 1 only, as pivotally secured adjacent the end of the pipe 11 to a split collar 16. A bolt 17 forms a pivotal support for the latch 15 and also serves to clamp the split collar in place about the pipe. In practice, the coupler usually remains in place on the end of the pipe to which it is secured by means of the latch 15 and a perforation 18 is provided in the split collar 16 just behind the latch 15 so that a cotter key or a similar device may be inserted therethrough and prevent the latch from being swung about its pivotal support to its unlatched position. At the opposite end of the coupling, an apron 19 may be arranged to rest on the ground and to provide a ramp arranged to guide the end of the other pipe 11 into the coupling. It is the latch and locking means at this end of the coupling that forms the subject matter of the present invention.

This latch comprises a pawl 20 pivotally secured as by a bolt 21 to a split collar 22 which embraces the pipe 11. The hooked end of the pawl 20 is adapted to be received within a recess generally indicated at 23 formed on the top of the coupling. The recess comprises a long wall 24 on one side, an end wall 25 and two short walls 26 and 27 on the other side. The relationship of the pawl and the recess 23 within which it is received is such that with the pipe 11 inserted and the hooked end of the pawl disposed within the recess, the pipe may not be rotated clockwise because the pawl engages the wall 24. Even with the pipe inserted as far as possible, the collar 22 strikes the end of the coupling and the pawl still prevents clockwise rotation of the pipe by engagement with the wall 24. This wall is shown terminating short of the central boss 13 for convenience in manufacture but for functional purposes, the wall could as well be continued to join the boss in the same manner as does the wall 27. The walls 26 and 27 cooperate to prevent counter-clockwise rotation of the pipe when it is fully inserted into the coupler or when it is retracted as far as possible with the pawl in the recess 23. Therefore in order to retract the pipe from the coupler, the pipe must occupy a midway position with the hooked part of the pawl in registry with the space between the walls 26 and 27 so that upon counter-clockwise rotation of the pipe, the pawl can move out of the recess 23.

The structure just described is important in the operation a description of which follows. The operator, usually grasping the pipe midway between its ends, holds the pipe with the pawl 20 at the top or in a position rotated slightly counter-clockwise, as indicated in Fig. 3, then thrusting the pipe into the coupling and rotating it slightly in a clockwise direction, causes the pawl to fall into the recess 23. Whether the pipe occupies the innermost or outermost position is of little concern at this moment because either the wall 26 or the wall 27 will prevent its rotation. However when the coupling operation is complete and the operator moves to the next length of pipe, the thrust of assembling the next coupling is transmitted through the coupling last assembled and usually moves the pipe inwardly. In this inward position the wall 27 prevents rotation of the pipe. After all of the couplings have been made up and water pressure is introduced, the pressure within the line tends to slide the pipes outwardly as far as possible until the pawl stops against the wall 25, as shown in Figs. 1 and 2. In this position, the wall 26 serves to prevent rotation of the pipe. Thus the operator need not be concerned with the exact position of the pipe in the coupling so long as the hooked end of the pawl is disposed within the recess 23 and rotation or removal of the pipe from the coupling can be accomplished only when the pipe is manipulated to a midway position with the hooked end of the pawl opposite the space between the walls 26 and 27.

A dogging member or lock 28 is suitably supported on the bolt 21 alongside of the pawl 20 and consists of a small rectangular plate preferably with one corner bent as indicated at 29 forming a handle. This dogging member which was described, in my co-pending application referred to hereinabove, as preventing the pipe from being forced into the coupling as other couplings are being made up along the line, may now serve only to form a permanent connection between two or more lengths of pipe where the pipe is sufficiently small to enable it to be handled in multiple lengths. When the dogging member 28 occupies the position illustrated in Fig. 1, it produces a joint which is automatically self-locking upon assembly of the pipe into the coupling. This is accomplished because the dogging member 28 engages the end of the coupling 10 and prevents the pipe from being thrust thereinto to a distance which enables the hooked end of the latch to escape from the recess 23. Assembly of the latch into latching position is still possible because its hooked end in the position shown in Fig. 3 rests upon an inclined portion or ramp 32 which approaches the recess so that upon rotation of the pipe 11 in a clockwise direction, the pawl will automatically drop into the recess. Therefore with the dog 28 in its locking position as shown, a worker holding the pipe 11 at a central position may simply insert its end into the coupling with the pawl either in a vertical position or rotated slightly counter-clockwise and a locked coupling is made which prevents the pipe from being withdrawn from the coupling until the dog 28 is swung upwardly around pin 21. A semi-permanent latch may also be obtained by inserting a cotter key in the perforations shown at 30 in the split collar 22 which register with a notch 31 in the rear of the pawl 20 when it is in its latched position. This cotter key also prevents the latch from being raised to its disengaged position.

I claim:

1. In a pipe coupler including a coupling member adapted to receive a pipe end, walls on the exterior of the coupling member forming an elongated recess extending longitudinally thereof, a pawl pivotally supported by the pipe and arranged to pivot upwardly to ride over the end of the coupling member and into the recess, one of the longitudinal walls of said recess having an opening intermediate its ends to permit exit of the pawl therefrom upon rotation of the pipe relative to the coupler and means to prevent the pawl from riding over either end of the recess.

2. In a pipe coupler including a coupling member adapted to receive a pipe end, walls on the exterior of the coupling member forming an elongated recess extending longitudinally thereof, a pawl pivotally supported by the pipe and arranged to pivot upwardly to ride over the end of the coupling member and into the recess, means to limit relative longitudinal movement of the pipe and coupler when the pawl is in the recess, said recess walls preventing rotation of the pipe and escape of the pawl therefrom when the pipe is fully inserted or retracted to the limit allowed, and one recess wall having an opening intermediate its ends to permit exit of the pawl upon rotation of the pipe relative to the coupler.

3. In a pipe coupler including a coupling member adapted to receive a pipe end, walls on the exterior of the coupling member forming an elongated recess extending longitudinally thereof, a pawl pivotally supported by the pipe and arranged to pivot upwardly to ride over the end of the coupling member and into the recess, said recess being just slightly wider than the pawl to prevent relative rotation of the pipe and coupling member, means to limit relative longitudinal movement of the pipe and coupling when the pawl is in the recess and one recess wall having an opening intermediate its ends to permit such relative rotation and exit of the pawl only when it is at an intermediate position in the length of the recess.

References Cited in the file of this patent

UNITED STATES PATENTS

| Number | Name | Date |
|---|---|---|
| 2,413,402 | Becker | Dec. 31, 1946 |
| 2,449,735 | Wyss | Sept. 21, 1948 |
| 2,464,466 | Stout | Mar. 15, 1949 |
| 2,499,476 | Eyerly | Mar. 7, 1950 |
| 2,621,061 | Beymer | Dec. 9, 1952 |